Nov. 12, 1968   N. T. NEAPOLITAKIS ET AL   3,410,360
VEHICLE AUTOMATIC SPEED CONTROL
Filed May 9, 1966
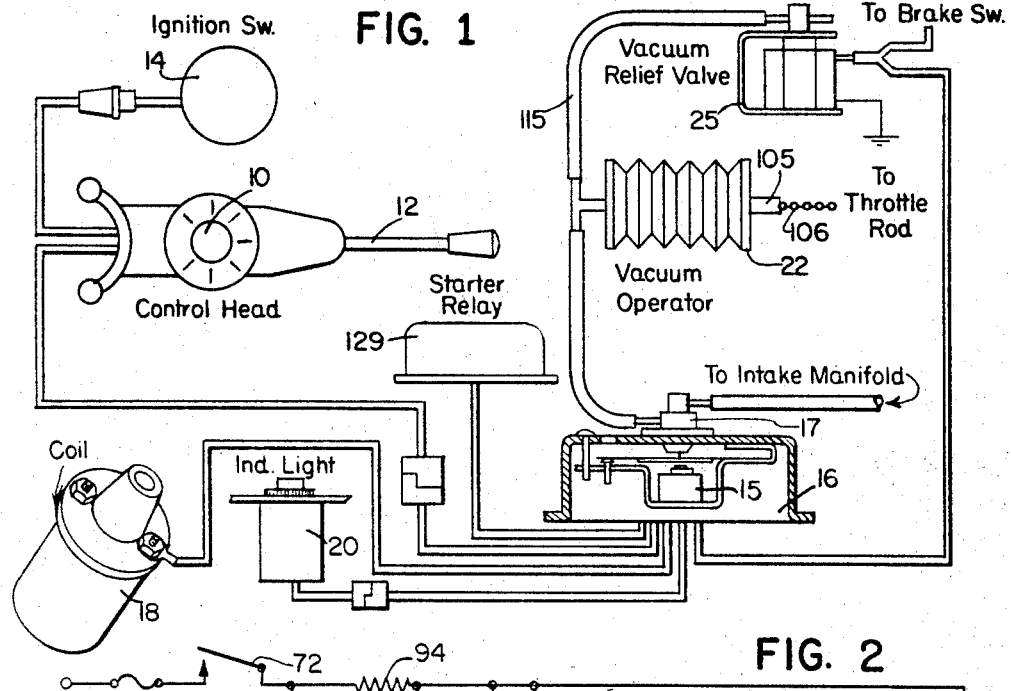
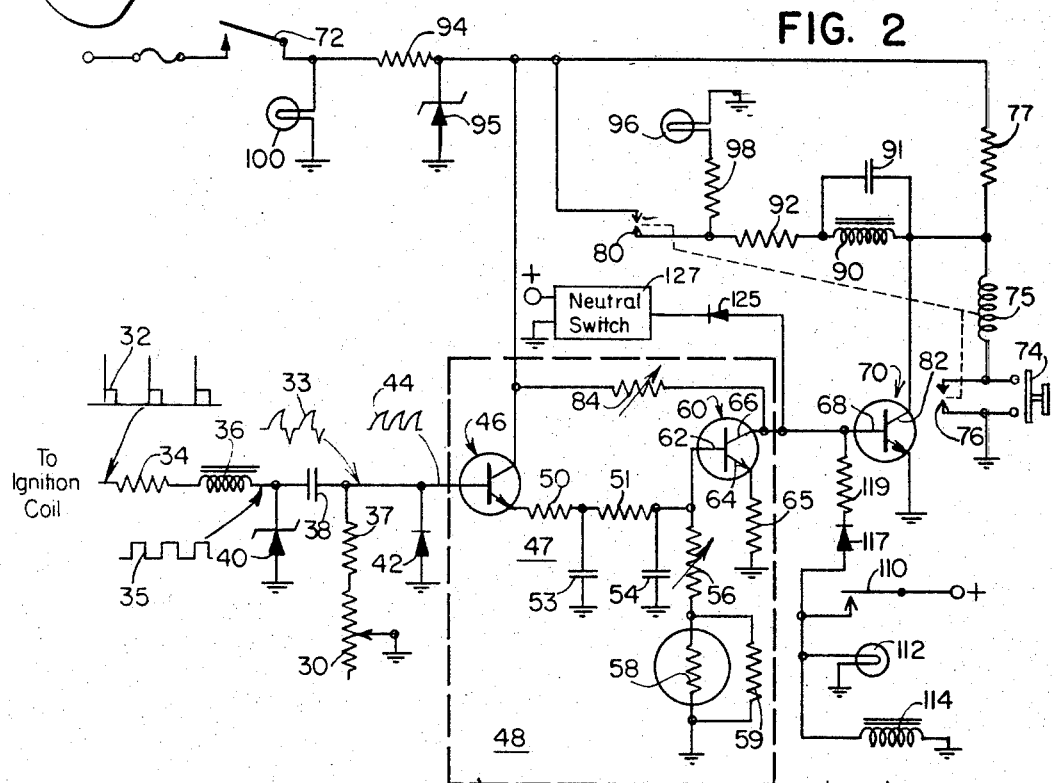
Inventors
NICHOLAS T. NEAPOLITAKIS,
RICHARD T. RACE.
BY
Mueller, Aichele & Rauner
ATTYS.

United States Patent Office 3,410,360
Patented Nov. 12, 1968

---

3,410,360
VEHICLE AUTOMATIC SPEED CONTROL
Nicholas T. Neapolitakis and Richard T. Race, Chicago, Ill., assignors to Motorola, Inc., Franklin Park, Ill., a corporation of Illinois
Filed May 9, 1966, Ser. No. 548,655
3 Claims. (Cl. 180—105)

ABSTRACT OF THE DISCLOSURE

A speed control system for a vehicle wherein pulses representing each increment of movement of the vehicle are coupled to a pulse shaping network which includes a potentiometer for establishing an energy level of the pulses representing the desired speed of the vehicle. An amplifier network is coupled between the pulse shaping network and a transistor switch. The amplifier network is responsive to the energy level of the shaped pulses to bias the transistor switch to first and second operating states. A vacuum regulator including a solenoid is coupled to the transistor switch and is responsive to the first and second operating states thereof to control the rate of speed of the vehicle.

---

This invention pertains generally to an electrical system for controlling the rate of movement of a cyclicly moving member, and more particularly to an automatic speed control for an automobile.

With the advent of modern highway systems, the number of hours of continuous travel which is accomplished in constant speed zones has been increased to the extent that automatic speed control has taken on added importance. Traveling long hours at the same speed can be very fatiguing, not only because of the effort required to steer the car, but also because of the continuous process of observing the speed on the speedometer and varying the foot pressure on the accelerator to maintain a steady rate of travel. In addition to being fatiguing, continuous acceleration and deceleration over long periods adds significantly to engine wear and reduces gas mileage.

It is one object of this invention to provide an improved system for controlling the repetition rate of a cyclicly moving member.

It is another object of this invention to provide an automatic speed control for a vehicle that provides constant speed operation to thereby reduce driver fatigue and increase gasoline mileage.

It is a further object of this invention to provide an automatic speed control that is relatively simple and inexpensive to manufacture.

A feature of this invention is a system for controlling the repetition rate of a cyclicly moving member wherein pulses representing each increment of movement of the member are coupled to a pulse shaping network which includes a potentiometer for establishing the energy level of pulses which provide the desired repetition rate of the member. An amplifier is coupled between the pulse shaping network and an electron control device and is responsive to the energy level of the shaped pulses to bias the control device to first and second operating states. An electromechanical rate control device is coupled to the electron control device and is responsive to the first and second states thereof to control the repetition rate of the cyclicly moving member.

Another feature of this invention is the control of a cyclicly moving engine of a motor vehicle wherein the electromechanical rate control device comprises a vacuum regulator valve including a solenoid, a vacuum operator coupled to the vacuum regulator valve, and a throttle coupled between the vacuum operator and the engine, with the control device coupled to the solenoid for operating the regulator valve. The shaped pulses having an energy level below the predetermined energy level cause the amplifier to bias the control device to the first stage to actuate the solenoid to control the vacuum regulator valve to vary the vacuum in the vacuum operator, thereby advancing the throttle to increase the rate of travel of the vehicle, and the shaped pulses having an energy level exceeding the predetermined level cause the amplifier to bias the control device to the second state to actuate the solenoid to control the vacuum regulator to vary the vacuum in the vacuum operator thereby retarding the throttle to decrease the rate of travel of the vehicle.

Another feature of this invention is an automatic speed control for use in a motor vehicle having breaking means, with the speed control having a vacuum release valve coupled to the vacuum operator which is responsive to the application of the vehicle breaking means to vent atmospheric air to the vacuum operator, and thereby disconnect the vacuum operator from the throttle. The automatic speed control also has a first electrical interlock which is responsive to the application of the vehicle breaking means to disable the electromechanical rate control device.

A further feature of this invention is an automatic speed control for a motor vehicle which has a drive selector which includes neutral and park positions wherein a neutral interlock is coupled to the input of the electronic control device and is responsive to the operation of the vehicle motor with the drive selector in a neutral or park position to couple a potential to the electron control device thereby disabling the electromechanical rate control device. A further interlock is responsive to the shorting of the electron control device to disable the electromechanical rate control device.

In the drawings:

FIG. 1 is a block schematic diagram illustrating the operation of the rate control system in accordance with this invention; and FIG. 2 is a schematic wiring diagram of the system shown in FIG. 1.

In one embodiment of this invention pulses from the ignition coil of an automobile engine are applied to a pulse shaping network including a potentiometer that is calibrated in miles per hour and which is responsive to the pulses for establishing a predetermined energy level representing the desired rate of travel of the automobile. An amplifier is coupled between the pulse shaping network and a transistor control device, and the output of the transistor control device is coupled to a solenoid which is part of a vacuum regulator valve. A vacuum operator is coupled between the vacuum regulator valve and the engine throttle. When the automobile is traveling slower than the speed set into the potentiometer, the shaped pulses have an energy level below the predetermined energy level, resulting in the amplifier biasing the transistor into conduction thereby energizing the solenoid to adjust the vacuum regulator valve which increases the vacuum to the vacuum operator to cause the same to advance the throttle to increase the rate of travel of the automobile. However, if the automobile is traveling faster than the speed set into the potentiometer the shaped pulses have an energy level exceeding the predetermined energy level so that the amplifier biases the control transistor into non-conduction thereby de-energizing the solenoid which reduces the vacuum output of the regulator to the vacuum operator to retard the throttle thereby decreasing the rate of travel of the automobile.

Various interlocks are provided to insure safe operation, including a vacuum relief valve coupled to the vacuum operator and responsive to the application of the automobile brakes to vent atmospheric air to the vacuum operator to disconnect the vacuum operator from the throttle. An electrical interlock is also responsive to the application of the automobile brakes to cause the vacuum operator to return the throttle to the idle position, and a neutral interlock is actuated when the automobile engine is running with the drive selector in either park or neutral and acts to connect the input of the transistor control device to a reference potential to render the control device non-conducting, thereby causing the vacuum operator to once again return the throttle to the idle position. To prevent high speed operation if the control transistor shorts and provides full current to the solenoid of the vacuum operator, another electrical interlock is provided which responds to the shorting of the control transistor to cause the vacuum operator to return the throttle to the idle position.

A general understanding of the invention may be had by referring to FIG. 1. The operator selects a desired speed on the dial 10 located on the control head which is mounted in a convenient place near, for instance, the rim of the steering wheel. When the speed of the automobile approximates the set speed, the operator pushes the lock-in button 12 which applies battery potential through the ON side of the ignition switch 14 to the electronic system 16 and electromagnetic vacuum regulator valve 17. The speed of the automobile is sensed at the ignition coil 18 and pulses from the coil 18 are coupled to the system 16. An indicator light 20 informs the driver when the automatic speed control system is locked in and is controlling the movement of the car.

Assuming that the system is locked in and the automobile is cruising on the level highway, when the vehicle begins to ascend a hill the engine will slow down. The electronic system 16 will sense the engine slowing down from the ignition coil 18 and will increase the voltage to the electromechanical vacuum regulator relay 15. The vacuum regulator valve 17 translates the change in voltage linearly into a change in vacuum and applies this change in vacuum to the vacuum operator 22 which acts to increase the throttle setting to increase the speed of the automobile. As the speed of the vehicle approaches the present speed, the electronic system 16 begins to sense the change in engine speed causing the voltage output of the electronic system 16 to drop. This reduces the voltage to the vacuum regulator valve 17 which in turn reduces the vacuum applied to the vacuum operator 22 thereby decreasing the throttle setting to slow the automobile down.

Should the driver of the automobile desire to accelerate to pass a car, he may simply override the speed control. When the accelerator is depressed, the speed of the vehicle will exceed the selected speed and the vacuum operator 22 will expand, releasing the pull on the throttle rod. As the driver takes his foot off of the accelerator, the vehicle will decelerate. As the vehicle speed approaches the selected speed, the electronic system 16 will then begin to apply voltage to the vacuum regulator valve 17, which will cause the vacuum operator 22 to increase the throttle setting.

For safe operation, it is necessary for the system to be disabled when the brakes are applied. Both electro-mechanical and electronic interlocks provide these safety features. When the brakes are applied, a vacuum relief valve 25 is actuated and vents atmospheric air to the vacuum operator 22, effectively returning the throttle to its idle position. In addition, the application of the vehicle brakes also electronically disables the system as will be explained subsequently.

A more detailed explanation of the operation of the speed control system may be had by referring to FIG. 2 of the drawing. The speed selecting dial 10 on the control head operates to move the tap on a potentiometer 30 which is calibrated in miles per hour. The system senses the pulses off the primary of the ignition coil as shown at 32. It should be understood, however, that other methods for sensing the speed of the automobile could be used, such as an alternator connected to the transmission, and the shape of the pulse which is applied to the system is not critical. The pulses 32 are coupled by resistor 34 through a choke 36 to a pulse forming or differentiating network which includes capacitor 38 and the potentiometer 30. A Zener diode 40 clips the spikes and tops off the pulses 32 and converts these into square pulse 35. The pulse forming network shapes the square waves into spikes shown at 33, with the amplitude of the spikes depending on the setting of potentiometer 30. The resulting pulses are clipped by diode 42 and are applied as shown in waveform 44 to the input transistor 46 of the emitter follower amplifier 48. The output wave, corresponding generally to the wave shown at 44, is then filtered by filter network 47 formed by resistors 50 and 51 and capacitors 53 and 54 and applied to the potentiometer 56 and thermistor 58, which has resistor 59 coupled across it. This load circuit provides thermal compensation for the system.

The DC voltage output of the filter circuit 47 is applied across the base 62 and emitter 64 of transistor 60 and the resistor 65. When the voltage across the base-emitter junction exceeds the threshold value (for a silicon transistor about $7/10$ of a volt), the transistor 60 will start to conduct, below this minimum value the transistor 60 will not conduct. When the transistor 60 is conducting the voltage at the collector 66 thereof will drop to a low value.

The collector of transistor 66 is connected to the base 68 of NPN transistor 70, and when transistor 60 conducts, transistor 70 will be biased off and will not conduct. However, when the transistor 60 does not conduct, its collector has infinite resistance and the supply potential is applied to the base 68 of transistor 70 through the resistor 84 so that transistor 70 will conduct.

In operation, the desired speed is set into potentiometer 30. This effectively establishes the level of the pulses from the ignition system which will cause the transistor 60 to conduct. Subsequently, the system is energized by the ON-OFF switch 72 and the automobile is brought up to the approximate speed set in the dial. At this point, the lock-in pushbutton 74 is depressed to complete a circuit which applies a potential across the reed relay coil 75 in series with resistor 77. This closes the reed relay switch contacts 76 and 80.

The voltage at the collector 82 of transistor 70 varies according to the speed of the automobile. When the automobile is below speed, the transistor 70 will be in conduction so that the voltage on collector 82 will be at a minimum. The variable resistor 84 insures, however, that the voltage on collector 82 of transistor 70 will not drop below approximately 2 volts. The value required to hold the reed relay 75 in is selected as approximately 2 volts, therefore, because the minimum voltage that will be on collector 82 of transistor 70 during operation is 2 volts, once the button 74 is pressed and the relay 75 closes contact 76, this contact along with contact 80 will remain closed until the voltage drops below the two volt value.

Coil 90 is connected to the collector 82 of transistor 70 and serves as the solenoid of the vacuum regulator. The coil 90 is coupled to the supply potential by resistor 92. A capacitor 91 is coupled across the coil 90 and is used to filter out a ripple which appears across the coil 90 at lower speeds. Current limiting resistor 94 and Zener diode 95 insures a regulated voltage supply to the system independent of supply voltage fluctuations.

An indicator light 96 is connected across the reed relay coil 75 and the ground reference potential. When the contacts 76 and 80 are open, the resistor 77 is in series with the indicator light and is of sufficient value that the current flowing through the indicator light is too low to light the filament of the bulb. However, when the contacts 76 and 80 are closed during the locking-in operation, the supply voltage is applied to the indicator lamp directly through resistor 98 and is suffiicent to light the filament. The indicator light shown at 100 is a light on the dashboard to indicate that the system has been energized to the stand-by mode.

With the system energized and the button 74 depressed, battery potential is coupled through the relay coil 75 closing the contacts 76 and 80 so that when the button 74 is released the contacts remain closed as described. The energy level of the D.C. voltage coupled to the base of transistor 60 is proportional to the pulses from the ignition coil, which represent the movement of the automobile, and the energy level established by the potentiometer 30. Should 50 miles per hour, for example, be set in the speed setting dial 10, when the car reaches this speed, the energy level coupled to the base 62 by the filtering circuit 47 will be sufficient to just bias the transistor 60 into conduction. Therefore, if the car is traveling at some speed slower than 50 miles per hour, a potential less than that necessary to bias transistor 60 into conduction will be coupled to the base 62 of transistor 60. With transistor 60 biased into an off state, the potential on base 68 of transistor 70 rises, therefore the transistor 70 is biased into conduction. The conduction of transistor 70 causes the voltage across the vacuum regulator valve coil 90 to increase. The armature of the coil is linked to the diaphragm of the vacuum regulator valve 17 so that an increase of force on the armature of the coil due to the increase of potential across the coil will cause an increase in pull on the diaphragm of the vacuum regulator 17 resulting in a corresponding increase in the regulated vacuum output which is applied to the vacuum operator 22. The vacuum operator 22 translates the vacuum output of the vacuum regulator valve into linear motion. The device of this particular embodiment consists basically of a rubber bellows held extended by means of a spring but other vacuum operators could be used. When a vacuum is created in the bellows, the bellows contract in proportion to the vacuum. Mounted on the bellows is a rod 105 that has a bead chain 106 connected thereto, which chain is connected to the throttle rod. Therefore, as the bellows contract with the increase in vacuum, the chain is moved to increase the throttle opening to increase the speed of the motor.

Should the speed of the car be greater than the speed which was set into the speed setting dial 10, the energy level of the D.C. current being coupled to the base 62 of transistor 60 will be greater than the predetermined energy level established by the setting on potentiometer 30. Therefore, the potential on base 62 will be great enough to bias transistor 60 into conduction. When transistor 60 conducts, the potential on base 68 of transistor 70 is decreased to the point where transistor 70 is biased into an off state. When transistor 70 is not conducting no potential appears across the vacuum regulator coil 90 so that there is a decrease on the pull on the diaphragm of the vacuum regulator 17. This results in a corresponding decrease in the regulator vacuum output which is supplied to the vacuum operator 22. With less vacuum in the vacuum operator, the pull on the throttle is decreased resulting in a decrease in the throttle setting. It can be easily seen that if the vehicle speed tends to drift above or below the selected speed, the system senses this much sooner than a human operator and causes suitable correction in the throttle position, resulting in gasoline economy.

With vehicle speed well below the speed set in the rate control dial 10, it might be expected that the amplifier 48 would bias transistor 70 in saturation by amplifier 48 causing the collector voltage on collector 82 to drop below the two volts required to hold in relay 75, however, the variable resistor 84 is set so that it acts to starve the transistor 70 and will not permit the voltage on the collector 82 to drop below the 2 volts required to hold in relay 75. It should be pointed out, however, that resistor 84 could be adjusted so that the system would drop out if the speed of the vehicle gets, for example, 5 miles per hour below the set reading by regulating the voltage on collector 82 of transistor 70 so that it would go below the two volts and the relay 75 would open thereby disabling the system.

Several interlocks have been included for safety of operation. It is obviously desirable for the system to be disabled if the operator steps on the vehicle brakes. Both electrical and electromechanical interlocks have been incorporated to serve this purpose. Stepping on the brakes closes brake switch 110 which lights brake light 112 and applies a potential to the solenoid 114. Solenoid 114 is a component of the vacuum relief valve 25. The vacuum relief valve 25 has two ports, one port which is always opened to the atmosphere and the other port which is connected to the vacuum operator 22 through line 115 in FIG. 1. When the solenoid 114 is energized, a plunger is activated by the solenoid which unseals the line 115 leading to the vacuum operator 22 venting atmospheric pressure into the vacuum operator 22 and returning the diaphragm of the vacuum servo 22 to its normal position thereby moving the throttle to its idle position.

Closing the brake switch 110 also applies battery potential through diode 117 and resistor 119 to the base 68 of transistor 70. This heavily drives the transistor 70 into conduction causing the voltage on the collector 82 to drop below the two volts needed to hold in contacts 76. Relay 75 therefore drops out and opens reed switch 76, and reed switch 80, thereby removing the potential from across the vacuum regulator valve solenoid 90 which also acts to return the throttle to its idle position.

A neutral interlock is provided in order to prevent the operator from accidentally locking the system in when starting the car in neutral or park. The diode 125 is connected to the neutral or park switch 127 of the automatic transmission or drive selector. One side of the switch is either grounded or goes to the ground through the starter relay coil 129 shown in FIG. 1. The other side of the neutral switch is connected to the start position of the ignition switch 14 through the starter relay coil 129 or directly. The diode 125 is connected to the battery potential through the start position of the ignition switch. As the car is being cranked, the diode blocks spurious spikes which may trigger the amplifier 48. Once the start operation is completed, the diode 125 virtually grounds the transistor 70 and prevents the system from locking in at any speed.

Finally should the transistor 70 become shorted the voltage on collector 82 will drop below 2 volts causing the relay 75 to open contact 76 and contact 80, to effectively remove the potential from across coil 90.

In the disclosed embodiment of the invention it has been found that components of the following types and values provide satisfactory results:

| | |
|---|---|
| Resistor 34 | 150 ohms. |
| Choke 36 | 10 millihenrys. |
| Zener diode 40 | 11 volts. |
| Capacitor 38 | .15 farad. |
| Resistor 37 | 1,000 ohms. |
| Potentiometer 30 | 4,000 ohms. |
| Diode 42 | Type SR 390. |
| Transistor 46 | Type 2N2712. |
| Resistor 50 | 680 ohms. |
| Capacitor 53 | 100 microfarads. |
| Resistor 51 | 480 ohms. |
| Capacitor 54 | 100 microfarads. |
| Resistor 59 | 4,700 ohms. |
| Thermistor 58 | 1,000 ohms. |
| Variable resistor 56 | 1,000 ohms (max.). |
| Resistor 65 | 10 ohms. |
| Transistor 60 | Type 2N2714. |
| Diode 117 | Type SR 390. |
| Resistor 119 | 470 ohms. |
| Transistor 70 | Type 2N3402. |
| Coil 114 | 30 ohms. |
| Relay coil 75 | 2,000 turns #39 wire 200 ohms. |
| Coil 90 | 1,900 turns #30 wire 30 ohms. |
| Capacitor 91 | 100 microfarads. |
| Resistor 92 | 3.3 ohms. |
| Resistor 93 | 100 ohms. |
| Light 96 | 12 volts. |
| Resistor 77 | 680 ohms. |
| Variable resistor 84 | 5,000 ohms (max.). |
| Zener diode 95 | 10 volts. |
| Resistor 94 | 4.7 ohms. |
| Diode 125 | Type SR39. |

What has been described is a relatively simple and economical automatic speed control for a vehicle which increases gasoline mileage and reduces driver fatigue.

We claim:

1. A system for controlling the rate of travel of a motor vehicle which has a drive selector which includes neutral and park positions, the system including in combination, pulsing means for providing pulses each of which represents an increment of travel of the vehicle, pulse shaping means coupled to said pulsing device, said pulse shaping means including variable means being responsive to said pulse for establishing a predetermined energy level of the pulses representing the desired rate of travel of the vehicle, control means having first and second operating states, circuit means having an input coupled to said pulse shaping means and an output coupled to said control means, said circuit means being responsive to the level of said shaped pulses to bias said control means to said first and second operating state, rate control means coupled to said control means and responsive to said first and second operating states of said control means to control the rate of travel of the vehicle, and neutral interlock means coupled to said control means, said neutral interlock means coupling said control means to a reference potential in response to operating the vehicle motor with the drive selector in neutral or park positions thereby disabling said rate control means.

2. In a motor vehicle having pulsing means providing pulses representing each increment of movement of the vehicle, a system for controlling the rate of movement of the vehicle including in combination, a pulse shaping circuit coupled to the pulsing means, said pulse shaping circuit including variable resistance means being responsive to said pulses to establish a predetermined energy level representing the desired rate of movement of the vehicle, control means having first and second operating states, amplifier means including first and second amplifying stages connected between said pulse shaping means and said control means, said amplifier means being responsive to the level of said shaped pulses to bias said control means to said first and second operating states, and rate control means coupled to said control means and being responsive to said first and second operating states of said control means to control the rate of movement of the vehicle.

3. The system for controlling the rate of movement of the vehicle of claim 2, wherein said control means is a transistor having an input and output, and said rate control means is a vacuum regulator that includes a solenoid, and wherein said amplifier means is coupled to said input of said transistor and said output of said transistor is coupled to said solenoid, so that the shaped pulses having an energy level below said predetermined energy level cause said amplifier to bias said transistor to said first state to control said solenoid to increase the rate of movement of the vehicle, and the shaped pulses having an energy level exceeding said predetermined energy level cause said amplifier to bias said transistor to said second state to control said vacuum regulator to decrease the rate of movement of the vehicle.

References Cited

UNITED STATES PATENTS

| | | | |
|---|---|---|---|
| 3,036,562 | 5/1962 | Scott | 123—102 |
| 3,088,538 | 5/1963 | Brennan et al. | 180—109 |
| 3,124,693 | 3/1964 | Peras. | |
| 3,198,985 | 8/1965 | Haskell | 317—5 |
| 3,207,252 | 9/1965 | Cripe et al. | |
| 3,249,175 | 5/1966 | Baxter | 180—108 |
| 3,319,733 | 5/1967 | Rath et al. | 180—106 |
| 3,332,406 | 7/1967 | Perry et al. | 180—82 X |

KENNETH H. BETTS, *Primary Examiner.*